United States Patent
Han et al.

(10) Patent No.: US 6,930,464 B2
(45) Date of Patent: Aug. 16, 2005

(54) DRIVING CIRCUIT FOR IMPROVING STARTING OF HYBRID INDUCTION MOTOR AND METHOD THEREOF

(75) Inventors: Seong-Do Han, Incheon (KR); Jun-Ho Ahn, Seoul (KR); Hyoun-Jeong Shin, Incheon (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/758,010

(22) Filed: Jan. 16, 2004

(65) Prior Publication Data

US 2005/0017670 A1 Jan. 27, 2005

(30) Foreign Application Priority Data

Jul. 23, 2003 (KR) ................................ 10-2003-0050728

(51) Int. Cl.$^7$ ................................................ H02P 1/26
(52) U.S. Cl. ................ 318/781; 318/775; 318/783; 318/788
(58) Field of Search .................... 318/781–788, 318/794, 795, 767, 799, 727, 778; 310/166, 151, 68 C, 72; 361/24, 22

(56) References Cited

U.S. PATENT DOCUMENTS

| | | | | |
|---|---|---|---|---|
| 3,725,757 A | * | 4/1973 | Ehrens et al. | ................ 318/795 |
| 3,737,752 A | * | 6/1973 | Strachan | ...................... 318/471 |
| 3,967,172 A | * | 6/1976 | Denny | .......................... 318/806 |
| 4,066,937 A | * | 1/1978 | Pfarrer et al. | ................ 318/775 |
| 4,272,714 A | * | 6/1981 | Vind | ........................... 318/783 |
| 4,384,312 A | * | 5/1983 | Fry | ............................... 361/24 |
| 4,387,330 A | * | 6/1983 | Zigler | ......................... 318/788 |
| 5,192,887 A | * | 3/1993 | Theis | ........................ 310/68 C |
| 5,212,436 A | * | 5/1993 | Nacewicz et al. | ........... 318/788 |
| 5,789,897 A | * | 8/1998 | Hamatani | .................... 318/783 |
| 5,861,697 A | * | 1/1999 | Sugita et al. | ................ 310/166 |

* cited by examiner

*Primary Examiner*—Paul Ip
(74) *Attorney, Agent, or Firm*—Birch, Stewart, Kolasch & birch, LLP

(57) ABSTRACT

A driving circuit for improving starting of a hybrid induction motor and its method includes a capacitor for operation electrically connected between a main coil and a auxiliary-coil, and a starting and current cutting-off means electrically connected with the capacitor for operation, applying a high starting current to a motor in starting, and cutting off the starting current when the motor is operated at a synchronous speed after the starting, so that a satisfactory starting characteristic can be obtained by increasing output under a low voltage state in starting, and effective operation can be performed by decreasing output under a normal operation state after the starting is completed.

8 Claims, 4 Drawing Sheets

DRIVING CIRCUIT FOR IMPROVING STARTING OF HYBRID INDUCTION MOTOR AND METHOD THEREOF

BACKGROUND OF THE INVENTION

1. Field of the Invention

The present invention relates to a hybrid induction motor, and particularly to a driving circuit for improving starting of a hybrid induction motor and its method, which is capable of obtaining a satisfactory starting characteristic by increasing output under a low-voltage state in starting, and capable of performing effective operation by decreasing output under a normal operation state after the starting is completed.

2. Description of the Background Art

In general, in a hybrid induction motor, since a normal torque and a reversed-phased torque are harmonized, an actual starting torque becomes '0'. Therefore, in starting, the hybrid induction motor is started as a two-phase induction motor by using a auxiliary-coil, and when the starting is completed, the hybrid induction motor is operated as a single-phase motor by isolating the auxiliary-coil from a main coil.

FIG. 1 illustrates a circuit schematically showing a starting unit of a general single-phase induction motor.

As shown in FIG. 1, in a driving circuit of a general hybrid induction motor, a auxiliary-coil 2 is connected in parallel to a main coil 1 which is connected in series to commercial power, and a capacitor (Cr) 3 for operation for generating a rotating magnetic field is added between the main coil and the auxiliary-coil.

In the starting unit of a hybrid induction motor constructed as above, in an initial stage of starting, the power of the capacitor for operation maintains an ON-state and thus a current flows to the auxiliary-coil, whereby the hybrid induction motor is operated as a two-phase induction motor to generate a starting torque. At this time, when the induction motor is operated at a normal speed, the power of the capacitor for operation becomes OFF-state, thereby cutting off a current that is applied to the auxiliary-coil 2. Thereafter, a current is applied to the main coil 1, thereby rotating a single-phase induction motor.

However, in the abovementioned hybrid induction motor is disadvantageous in that a minimum voltage needed for starting the motor is increased, thereby degrading reliability. In addition, if the hybrid induction motor is designed so as to start under a low voltage state, a large rotating torque and a large consumption power are needed in normal operation, thereby degrading operation efficiency.

SUMMARY OF THE INVENTION

Therefore, an object of the present invention is to provide a driving circuit for improving starting of a hybrid induction motor and its method capable of improving starting efficiency of the motor by reliably starting the motor with minimizing a voltage needed for starting and applying a high starting current, and by operating the motor with a proper current or less after the starting (or in normal operation).

To achieve these and other advantages and in accordance with the purpose of the present invention, as embodied and broadly described herein, there is provided a driving circuit for improving starting of a hybrid induction motor having a main coil forming a main magnetic field and a auxiliary-coil connected in parallel to the main coil and forming a rotating magnetic field corresponding to a magnetic field generated by the main coil including; a capacitor (Cr) for operation electrically connected between the main coil and the auxiliary-coil; and a starting and current cutting-off means electrically connected with the capacitor for operation, applying a high starting current to a motor in starting, and cutting off the starting current when the motor is operated at a synchronous speed after the starting.

To achieve these and other advantages and in accordance with the purpose of the present invention, as embodied and broadly described herein, there is provided a driving method for improving starting of a hybrid induction motor having a main coil forming a main magnetic field and a auxiliary-coil connected in parallel to the main coil and forming a rotating magnetic field corresponding to a magnetic field generated by the main coil; including the steps of: when single phase commercial power is applied thereto, turning on a PTC thermistor and simultaneously applying a high starting current to a motor through a capacitor (Cs) for starting; when a rotating magnetic field is generated through the capacitor (Cs) for starting, starting a magnet rotor and, after the magnet rotor rotates at a synchronous speed, rotating a cage rotor; and after a predetermined time elapses, turning off the PTC thermistor to apply a low operation current to a motor through a capacitor (Cr) for operation, and driving an induction rotor.

To achieve these and other advantages and in accordance with the purpose of the present invention, as embodied and broadly described herein, there is provided a driving method for improving starting of a hybrid induction motor having a main coil forming a main magnetic field and a auxiliary-coil connected in parallel to the main coil and forming a rotating magnetic field corresponding to a magnetic field generated by the main coil; including the steps of: when single-phase commercial power is applied thereto, turning on a PTC thermistor having a low resistance value and turning off an NTC thermistor having a high resistance value to apply a high starting current to a motor; starting a magnetic rotor by generating a rotating magnetic field through a capacitor (Cr) for operation, and rotating a cage rotor after the magnet rotor rotates at a synchronous speed; and after a predetermined time elapses, turning off the PTC thermistor and turning on the NTC thermistor to apply a low operation current to a motor, and operating an induction rotor.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a unit of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Preferred embodiments of a driving circuit of a hybrid induction motor and a method thereof, which is capable of obtaining a satisfactory starting characteristic by increasing output under a low-voltage state in starting, and capable of performing effective operation by decreasing output when the motor is in a normal operation state after the starting is completed, will now be described with reference to accompanying drawings.

Figure 1:
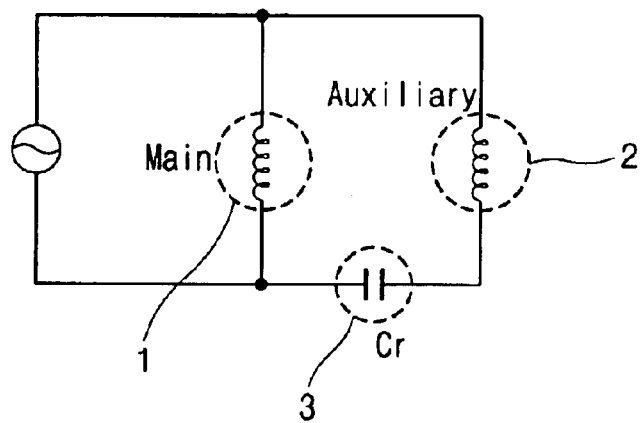
FIG. 1 illustrates a circuit schematically showing a starting unit of a general single-phase induction motor.
Figure 2:
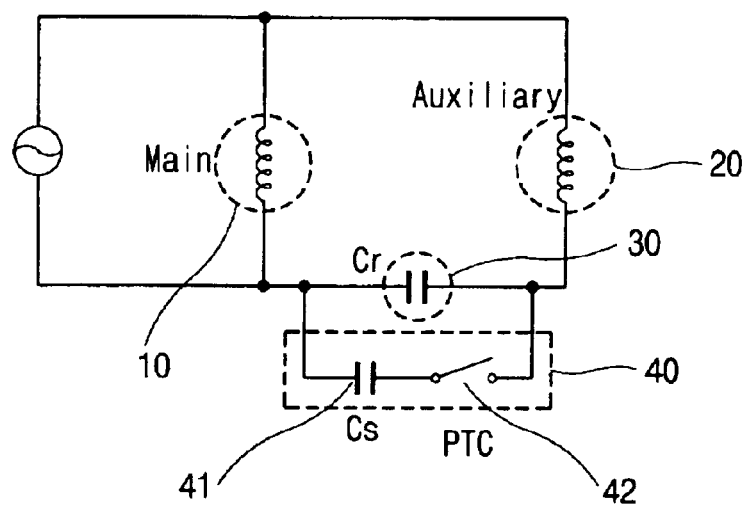
FIG. 2 is a schematic view showing a driving circuit of a hybrid induction motor in accordance with the present invention.

FIG. 2 is a schematic view showing a driving circuit of a hybrid induction motor in accordance with present invention.

As shown therein, a driving circuit of a hybrid induction motor in accordance with the present invention includes a main coil 10 forming a main magnetic field; a auxiliary-coil 20 connected in parallel to the main coil 10 and forming a rotating magnetic field corresponding to a magnetic field generated by the main coil; a capacitor (Cr) 30 for operation electrically connected between the main coil 10 and the auxiliary-coil 20; and a starting and current cutting-off means electrically connected with the capacitor (Cr) 30 for operation, applying a high starting current to a motor in starting, and cutting off the starting current when the motor is operated at a synchronous speed after the starting. Herein, the starting and current cutting-off means 40 includes a capacitor (Cs) 41 for starting connected in parallel to the capacitor 30 for operation, and applying a high starting current to a motor in starting; and a switch connected in series to the capacitor 41 for starting, turned on in starting, and turned off in normal operation. Herein, the switch is a resistance device, and, as an example, there may be a PTC thermistor 42 (Positive Temperature Coefficient Thermistor), resistance of which increases to restrain a flow of currents when power is applied thereto. In addition, a capacitor (Cr) 30 for operation is connected in series to the ends of the main coil 10 and the auxiliary-coil 20, and the capacitor (Cs) 41 for starting and the PTC thermistor 42 which are connected in series to each other are connected in parallel to the capacitor (Cr) 30 for operation.

Operations of the driving motor for improving starting of the hybrid induction motor in accordance with the present invention constructed as above will now be described.

First, in starting the motor, when single-phase AC power is applied to a coil of a single-phase stator including the main coil and the auxiliary-coil, an electromotive force is generated at the auxiliary-coil 20 by a high starting rotating magnetic field and an induction current through the capacitor (Cr) 30 for operation connected in series to the auxiliary-coil 20, the capacitor (Cs) 41 for starting and the PTC thermistor 42, thereby forming a magnetic field.

Therefore, a rotor is rotated centering on a rotation shaft by an interaction of magnetic fields formed by the coil. When the rotor rotates at an around synchronous speed, a resistance value of the PTC thermistor 42, a current cutting-off means is increased by self heat-generation and its current value is relatively lowered so that the PTC thermistor is off thereby cutting off the power of the capacitor (Cs) 41 for starting. Thereafter, the rotor performs operation at a synchronous speed by an interaction between a magnetic field of the main coil 10 and the auxiliary-coil 20 and a magnetic field of a permanent magnet, thereby performing highly effective operation.

Figure 3:
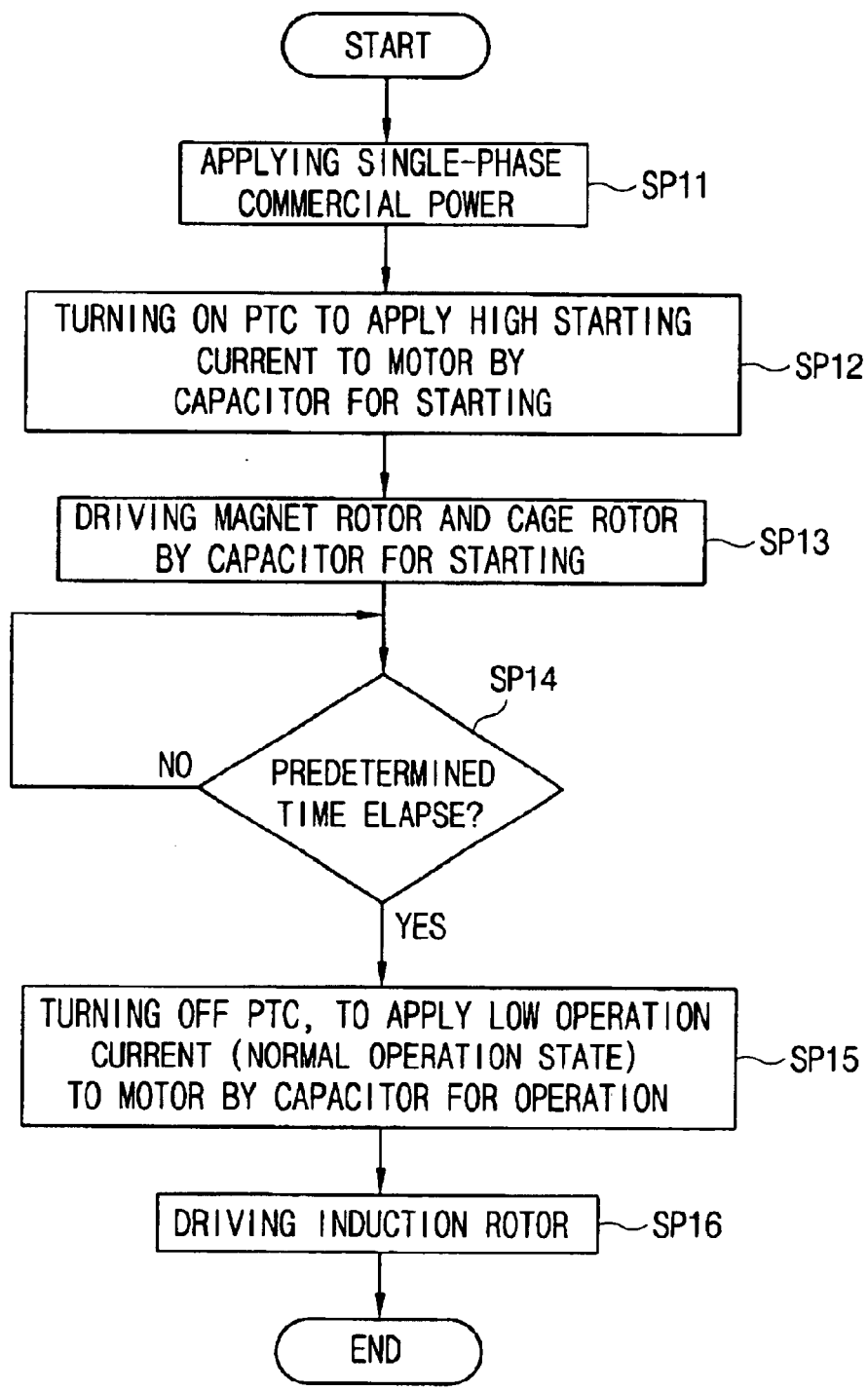
FIG. 3 is a flow chart showing operations with respect to a driving method of a hybrid induction motor in accordance with the present invention.

FIG. 3 is a flow chart showing operations with respect to a driving method of a hybrid induction motor in accordance with the present invention.

As shown in FIG. 3, the driving method of a hybrid induction motor in accordance with the present invention includes a step in which when single-phase commercial power is applied thereto, the PTC thermistor 42 having a low resistance value is turned on to apply a high starting current to (a low-voltage state) a motor by the capacitor (Cs) 41 for starting (SP11, SP12); a step in which a magnet rotor is started by generating a rotating magnetic field by the capacitor (Cs) 41 for starting, and after the magnet rotor rotates at a synchronous speed, a cage rotor is driven (SP13); and a step in which when a certain time elapses (SP14), the PTC thermistor 42 is turned off because self-resistance increases, to apply a low operation current (a normal operation state) to a motor by the capacitor (Cr) 30 for operation, and thus an induction rotor is driven (SP15, SP16).

Figure 4:
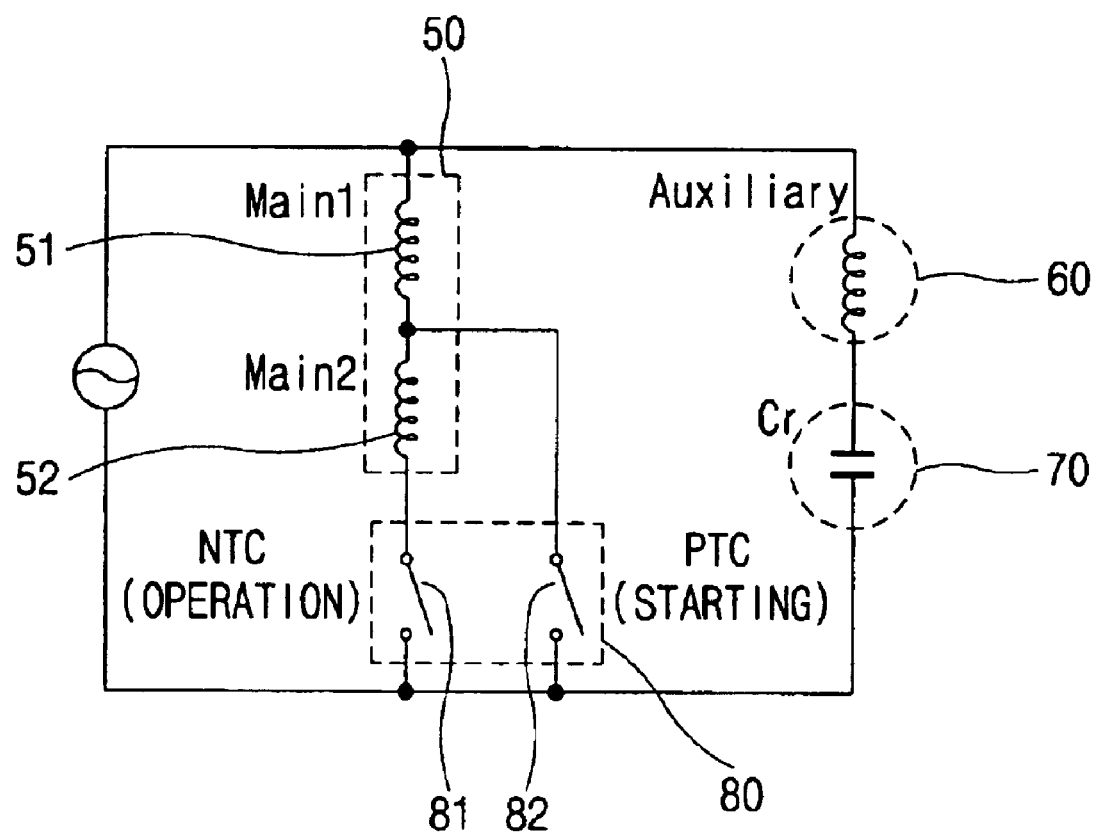
FIG. 4 a schematic view showing a driving circuit of a hybrid induction motor in accordance with a different embodiment of the present invention.

As shown in FIG. 4 which will be mentioned afterwards, showing a different embodiment of the present invention, by forming a tap in a main coil 50, the main coil is divided into a first main coil 51 and a second main coil 52, and through the starting and current cutting-off means 80, a high starting current is applied to a motor in starting, and a low operation current is applied to the motor in normal operation.

FIG. 4 is a view showing a driving circuit of a hybrid induction motor in accordance with a different embodiment of the present invention.

As shown in FIG. 4, a driving motor of a hybrid induction motor in accordance with the present invention includes first and second main coils 51, 52 forming a main magnetic field; a auxiliary-coil 60 connected in parallel to the first and second main coils 51, 52, and forming a rotating magnetic field corresponding to a magnetic field generated by the first and second main coils 51, 52; a capacitor (Cr) 70 for operation electrically connected between the first and second main coils 51, 52 and the auxiliary-coil 60; and a starting and current cutting-off means 80 electrically connected with the capacitor 70 for operation, applying a high starting current to a motor in starting, and cutting off the starting current when the motor is operated at a synchronous speed after the starting. Herein, the starting and current cutting-off means 80 includes a PTC thermistor 82 (Positive Temperature Coefficient Thermistor) connected between a connection point of the first and second main coils 51, 52 and power, turned on in starting, and turned off in normal operation; and an NTC thermistor 81 (Negative Temperature Coefficient Thermistor) connected in series to the first and second main coils 91, 92, turned off in starting, and turned on in normal operation.

Operations of the driving circuit for improving starting of a hybrid induction motor in accordance with the present invention constructed as above will now be described.

First, resistance of a PTC thermistor 82 increases when a temperature is rises, and on the contrary, resistance of an NTC thermistor 82 decreases when a temperature rises. Accordingly, in an initial stage of starting of a motor, when single-phase commercial power is applied to the motor, the PTC thermistor 82 is turned on, and the NTC thermistor 81 is turned off. Therefore, in an initial stage of starting, a magnet rotor is started by generating a rotating magnetic field only with a first main coil and a auxiliary-coil which are connected to the PTC thermistor 82 and after the magnet rotor is rotated at a synchronous speed, a cage rotor is rotated.

Thereafter, when a predetermined time elapses, the PTC thermistor 82 is turned off because of a self-resistance value which becomes large, and, on the contrary, the NTC thermistor 81 is turned on because of a self-resistance value which becomes small. That is, under a normal operation state, the NTC thermistor 81 that is connected in series to the first and second main coils 51, 52 is turned on to apply a normal voltage to the motor thereby effectively operating the motor.

Figure 5:
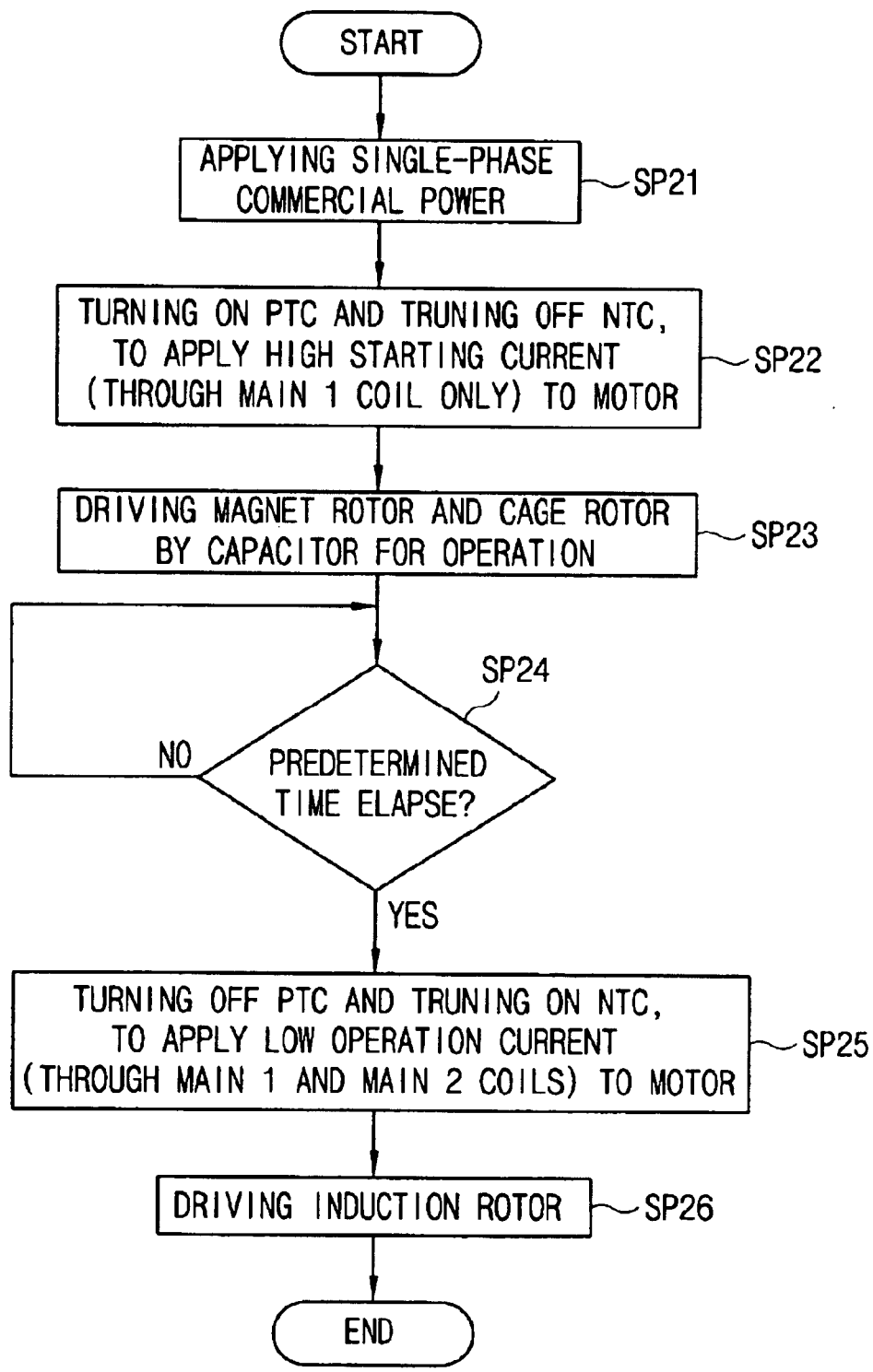
FIG. 5 is a flow chart showing operations with respect to a driving method of a hybrid induction motor in accordance with the present invention.

FIG. 5 is a flow chart showing operations with respect to a driving method of a hybrid induction motor in accordance with the present invention.

As shown in FIG. 5, the driving method of the hybrid induction motor in accordance with the present invention includes a step in which when single-phase commercial power is applied thereto, a PTC thermistor 82 having a low resistance value is turned on and an NTC thermistor 81 having a high resistance value is turned off, to apply a high current (a low-voltage state) to a motor (SP21, SP22); a step in which, a magnet rotor is started by generating a rotating magnetic field by a capacitor (Cr) 81 for operation, and after the magnet rotor is rotated at a synchronous speed, a cage rotor is rotated (SP23); and a step in which after a certain time elapses, the PTC thermistor 82 is turned off because self-resistance becomes large and the NTC thermistor 81 is turned on because self-resistance becomes small, to apply a low operation current (a normal operation state) to a motor, and an induction rotor is operated at a synchronous speed (SP24~SP26).

As so far described, the present invention is advantageous in that a voltage needed for starting is minimized, at the same time, a motor is reliably started by applying a high starting current, and, after the starting (in normal operation), the motor is operated with a proper current or less, thereby improving starting efficiency of the motor and effectively starting the motor even under a low voltage state.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A driving circuit for improving starting of a hybrid induction motor comprising:

a main coil, the main coil including a first coil and a second coil, the first coil and the second coil being connected in series, the main coil forming a main magnetic field;

an auxiliary-coil connected in parallel to the main coil and forming a rotating magnetic field corresponding to a magnetic field generated by the main coil;

a capacitor (Cr) for operation electrically connected between the main coil and the auxiliary-coil; and a starting and current cutting-off means electrically connected with the capacitor (Cr) for operation, for applying a high starting current to a motor in starting and cutting off the starting current to a low operation current when the motor is operated at a synchronous speed in a normal operation after the starting.

2. The driving circuit of claim 1, wherein the starting and current cutting-off means comprises:

a PTC thermistor connected between a connection point of the first and second coils and power; and an NTC thermistor (Negative Temperature coefficient Thermistor) connected in series to the first and second coils.

3. The driving circuit of claim 2, wherein the PTC thermistor is turned on in starting and turned off in the normal operation, and the NTC thermistor is turned off in starting and turned on in the normal operation.

4. A driving circuit for improving starting of a hybrid induction motor having a cup-shaped rotating magnet rotor rotating at a synchronous speed and an induction rotor inside the magnet rotor, and composed of a main coil and a auxiliary-coil comprising:

a PTC thermistor dividing the main coil into first and second main coils, connected between a connection point of the first and second main coils and power, turned on in starting of a motor, and turned off in normal operation; and an NTC thermistor connected in series to the first and second main coils, turned off in starting of a motor, and turned on in normal operation.

5. A method for improving starting of a hybrid induction motor having a main coil forming a main magnetic field and a auxiliary-coil connected in parallel to the main coil and forming a rotating magnetic field corresponding to a magnetic field generated by the main coil comprising the steps of:

when single-phase commercial power is applied thereto, turning on a PTC thermistor (Positive Temperature Coefficient Thermistor) having a low resistance value and turning off an NTC thermistor having a high resistance value to apply a high starting current to the motor;

starting a magnet rotor by generating the rotating magnetic field through a capacitor (Cr) for operation, and rotating a cage rotor after the magnet rotor rotates at a synchronous speed; and after a predetermined time elapses, turning off the PTC thermistor and turning on the NTC thermistor (Negative Temperature Coefficient Thermistor) to apply a low operation current to the motor, and operating an induction rotor.

6. The method of claim 5, wherein by forming a tap in the main coil, the main coil is divided into a first main coil and a second main coil.

7. The method of claim 6, wherein the PTC thermistor (Positive Temperature Coefficient Thermistor) is connected between a connection point of the first and second main coils and power, is turned on in starting, and is turned off in normal operation.

8. The method of claim 6, wherein the NTC thermistor (Negative Temperature Coefficient Thermistor) is connected in series to the first and second main coils, is turned off in starting, and is turned on in normal operation.

* * * * *